United States Patent [19] [11] 3,720,819
Newton et al. [45] March 13, 1973

[54] DIRECT DIGITAL COMPUTER CONTROL ERROR DETECTOR SYSTEM

[75] Inventors: Cecil J. V. Newton, Baytown, Tex.; Ernest W. Harrison, Tripoli, Libya

[73] Assignee: Esso Research and Engineering Company, Linden, New Jersey

[22] Filed: Nov. 26, 1971

[21] Appl. No.: 202,551

Related U.S. Application Data

[63] Continuation of Ser. No. 25,254, March 31, 1970.

[52] U.S. Cl............................235/153 AE, 235/151.1
[51] Int. Cl...............................................G06f 11/00
[58] Field of Search.........235/153 AE, 153 A, 151.1; 340/172.5

[56] References Cited

UNITED STATES PATENTS 3,526,757  9/1970  Rees et al............................235/151.1
2,540,001  11/1970  Gormley et al....................235/151.1
3,681,578  8/1972  Stevens..............................235/153

Primary Examiner—Charles E. Atkinson
Attorney—Thomas B. McCulloch et al.

[57] ABSTRACT

An error detection device for a direct digital process control computer detects at least two common computer output errors and immediately informs the computer and the operator of such error. The two types of errors are (a) a difference between two digital-to-analogue converter (DAC) outputs that is larger than a predetermined limit, and (2) two or more bits in an ECO word at the same time. Preferably it also detects (3) a DAC output that is less than a predetermined limit, and (4) a DAC output that is greater than a predetermined limit. On detecting an error, the device sends a process interrupt signal to the computer, switches the affected controller to backup controls, and operates an alarm to alert the operator.

9 Claims, 2 Drawing Figures

DIRECT DIGITAL COMPUTER CONTROL ERROR DETECTOR SYSTEM

This is a continuation, of application Ser. No. 25,254, filed Mar. 31, 1970.

BACKGROUND OF THE INVENTION

FIELD OF THE INVENTION

This invention relates to process control by digital computers responsive to operating conditions in the controlled process, and particularly to digital computers utilizing a digital-to-analog converter (DAC) and at least two multiple-bit electronic contact operates (ECO) to set a matrix for addressing each of the controllers in the controlled process. One bit in one ECO word and one bit in the other ECO word form a unique address for any one of the controllers, so that the output control voltage from the DAC can be directed to the addressed controller for the desired control action. More particularly, the invention involves the use of circuits for detecting errors in output control voltage from the computer DAC and the erroneous occurrence of an ON state for more than one of the bits of an ECO word in the formulation of an address to a controller.

When digital computers directly control a process, the computer performs the control function by measuring a process variable, comparing this variable to a desired value, and calculating an output signal which is employed to correct a controller to the desired value to control the process. If there is a fault in the interface equipment, or in the computer, or in the output control logic circuitry, or if a short occurs in the output control voltage on application of an external voltage, the control signal is erroneously transmitted and process conditions can be violently upset. This can be disastrous because of the large number of process conditions which are changed per second in a control system directed by a digital computer. It is therefore clearly desirable to have means to check the accuracy of the control function before the control steps are taken through the process controllers. Heretofore, there has been no reliable way of checking both the magnitude of the output control signal and the identification signal for choosing the particular controller device for which the output control signal is intended.

SUMMARY OF THE INVENTION

By this invention, a system is provided for detecting digital-to-analog converter (DAC) outputs which are different from, in excess of, or less than a predetermined limit, for detecting whether more than one of at least two multiple-bit ECO words have an ON state at the same time, and for stopping the computer from taking erroneous control action before a massive upset has time to occur while simultaneously switching the process controllers to a backup control when computer control of the process controllers is cut off.

In order to better illustrate this invention, the protected DAC output signal circuits and the ECO addressing logic circuits are first described in their normal operation, and then in their protected operation when an erroneous signal is generated, with reference to the following drawings.

DESCRIPTION OF THE DRAWINGS

Referring to FIG. 1, in normal operation, a digital computer 10 measures process variables of a controlled process, comparing the variables to a programmed value and generating a digital value to correct the operation of a controller of the process, for example, to change the position of a controlling valve. The digital value is fed to a digital-to-analog converter DAC 11, which generates an analog voltage proportional to the digital signal received. The analog voltage is directly proportional to the change to be made in the process controller. The output control voltage, indicated as voltage $V_1$, is transmitted from DAC 11 towards its controller destination by electrical lines 12, 13. The identification of the proper controller for which the message in the output control voltage is destined is made by a controller selection circuit in the computer 10 which operates on multiple-bit ECO words. One bit in each word is used to form a matrix for addressing the proper one of the plurality of controllers. In a computer using sixteen bit words, two sixteen bit words can be utilized to form a matrix from which 256 controllers can be individually selected. In FIG. 1, the computer is shown as containing two three-bit words, in order to simplify the circuitry. However, it is to be understood that the normal computer, utilizing sixteen bit words, will employ circuitry similar to that shown for the three-bit words, but will contain selector circuitry for each of the bits so that each word requires sixteen circuits similar to those shown in the figure. The number of controllers will depend upon the control functions to be carried out and will, as in the case of the sixteen bit words, depend upon the number of combinations of bits which could be made to identify the separate controllers.

Referring to FIG. 1, it is seen that the various controllers receive the output control voltage from lines 12, 13 only if series-connected switches are closed in response to bits from each of the two identifying binary words. Thus, controller 1 is addressed only if bit 1a of word 1 is in the ON state when bit 2c of word 2 is in the ON state, such that switch 1 is closed when switch 4 is closed. The ON state is suitably produced when each bit is binary 1 (or binary 0).

Figure 1:
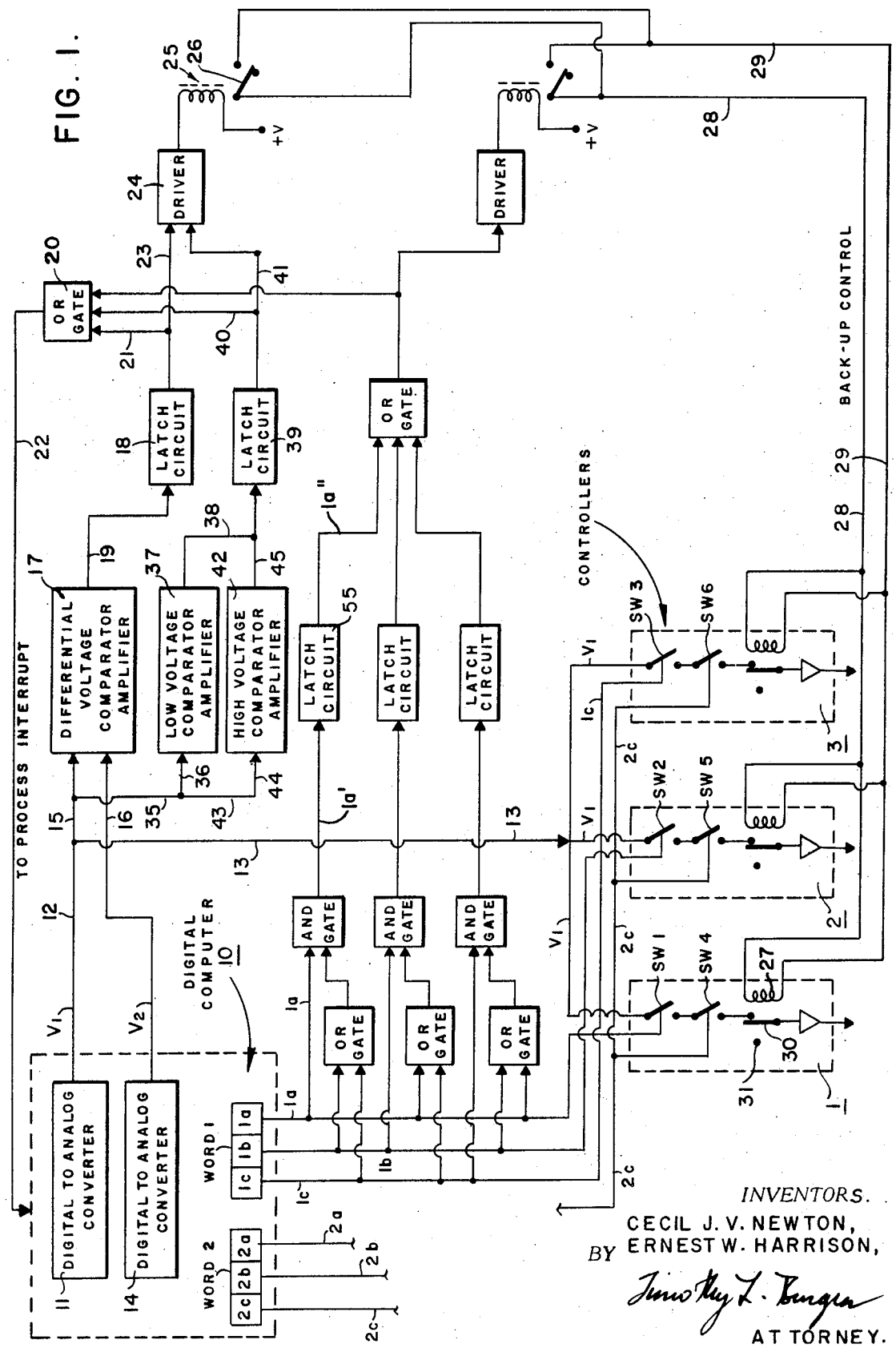
FIG. 1 is a schematic diagram of circuitry employed in this invention.

It is seen in this type of direct digital process control that if more than one bit from the same word is in the ON state, for example, if more than one bit is binary 1, then more than one controller is made operable. For example, if both bits 1a and 1b are binary 1, and if bit 2c is binary 1, both controllers 1 and 2 are made operative and receive the output control voltage $V_1$ from lines 12, 13. It will also be appreciated that an output control voltage $V_1$ which is different than a preset or programmable limit may upset a properly addressed controller, and if more than one controller is improperly addressed, an errant output control voltage of $V_1$ can produce its damage many times over.

DAC Output Control

According to the present invention, several types of erroneous output control voltage are detected and control of the regulated process is protected. In one type, a predetermined deviation in analog voltage response to digital input is detected by utilizing a second DAC 14 to generate an analog voltage $V_2$ which is used only for comparison with the analog voltage $V_1$ generated by the primary DAC 11. The digital computer 10 provides the same information to both DACs, so that normally the DACs will generate the same output voltages. Electrical line 15 feeds output control voltage $V_1$, and line 16 feeds output voltage $V_2$, into a differential voltage comparator-amplifier 17. If, after a delay for settling time and computer instruction execution time, the voltage difference exceeds a preset maximum value in comparator-amplifier 17, a signal is generated which engages latch circuit 18 by way of line 19. Latch circuit 18 then responds with a "latched-in" process interrupt signal which passes to the digital computer 10 through an OR gate 20 by way of lines 21, 22, stopping the feed of digital information to DAC 11. Latch circuit 18 simultaneously sends a signal by way of line 23 to driver 24, which amplifies it and uses it to energize coil 25, and thereby actuating relay 26. As illustrated, relay 26 is in the normally open position which subjects the controllers to digital direction. The signal from latch circuit 18 switches the relay 26 to the closed position. This energizes the controller coils 27 by way of lines 28, 29, switching the controller relays 30 from digital control to a backup control mode, indicated by reference numeral 31, suitably a manually controlled mode or an automatic analog control programmed to a preset standard. The "latched-in" condition continues until an operator manually resets the latch circuit to its "set" output of zero, as hereinafter described in more detail.

The DACs are commonly included in the digital computer. For example, the IBM Model 1800 digital computer can be outfitted with any of four types of DACs made by IBM. A suitable DAC by IBM identification is Machine Type 1856, DAC Model 3252, MOD-2.

The present invention also provides means for checking the absolute voltage of the DAC control voltage outputs so that if it falls below a predetermined minimum, the same control function is carried out as when comparator-amplifier 17 responds to a difference between output voltages. Thus, lines 35, 36 transmit output control voltage $V_1$ from DAC 11 to low voltage comparator-amplifier 37. Low voltage comparator-amplifier 37 operates by comparing output control voltage $V_1$ with a standard low voltage, e.g. 2 volts, which corresponds with the programmable or predetermined limit of the direct digital computer system. If the output control voltage $V_1$ is less than the standard low voltage, a signal is generated and transmitted by line 38 to latch circuit 39, which emits a "latched-in" process interrupt signal which is carried by lines 40, 22 to digital computer 10. A signal is simultaneously generated and transmitted by line 41 to driver 23 which is effective to place the controllers affected on the backup system, as hereinbefore described.

In the same manner, an output control voltage $V_1$ in excess of a programmable limit is detected by feeding output control voltage 15 to a high voltage comparator-amplifier 42 by way of lines 43, 44. High voltage comparator-amplifier 42 compares the output control voltage $V_1$ to a standard maximum voltage level, e.g. 10 volts, corresponding to the maximum programmable limit of the system, and if output control voltage $V_1$ exceeds that level (as may occur when a high voltage is mistakenly applied to the output control voltage line at a remote location), a signal is generated by the comparator-amplifier 42 which passes by way of line 45 to latch circuit 39, engaging latch circuit 39 as hereinbefore described to interrupt the control of the process controllers by the digital computer and to switch the affected process controllers onto the backup system.

Figure 2:
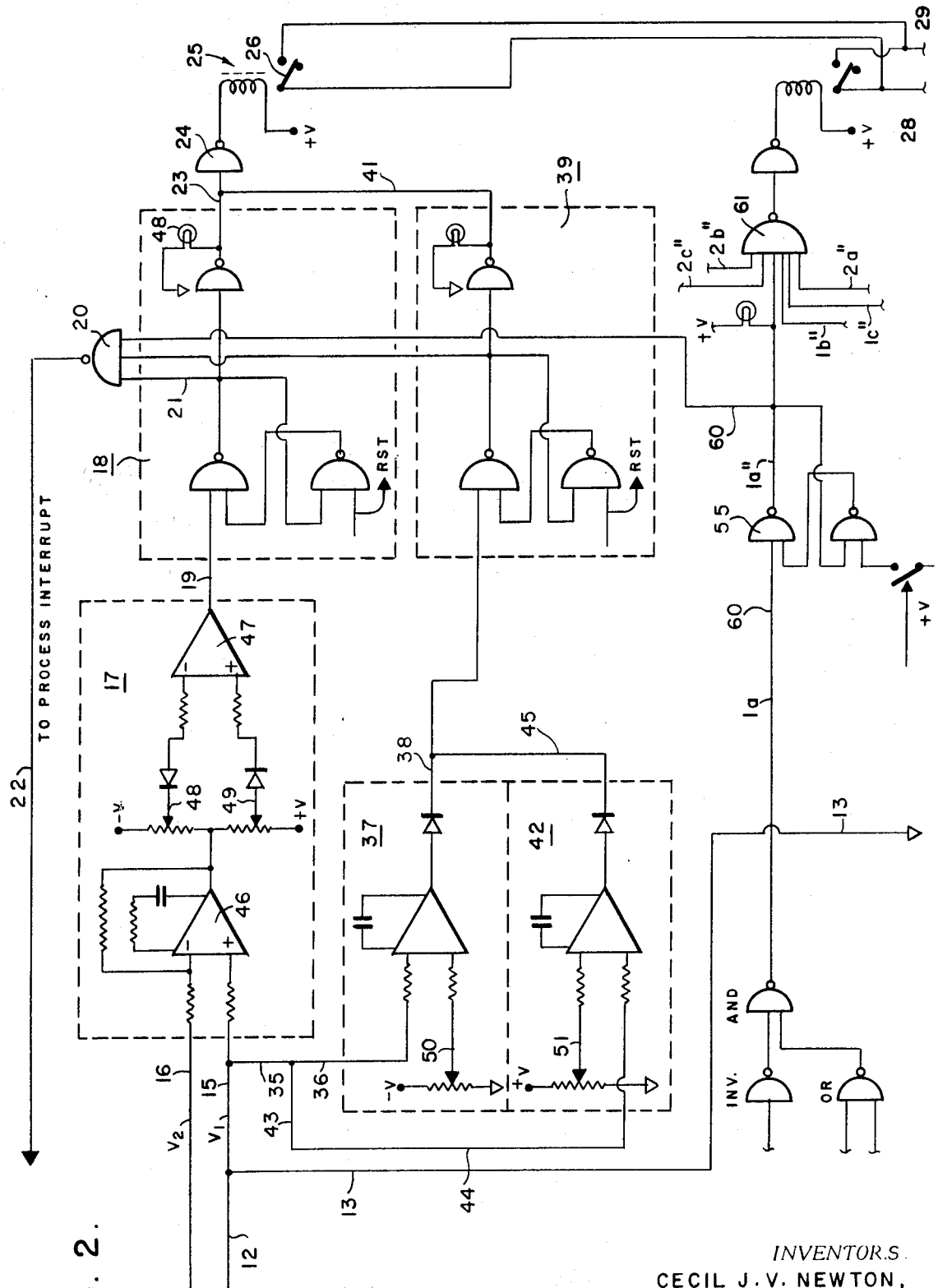
FIG. 2 is an electrical circuit of portions of the schematic diagram of FIG. 1, and illustrates a preferred embodiment of constructing the circuit system of this invention.

A preferred method of constructing the comparator-amplifiers 17, 37, and 42 is illustrated in FIG. 2, which also depicts the circuitry connection of the latch circuits 18 and 39. Referring to FIG. 2, the voltage $V_2$ from DAC 14 and the voltage $V_1$ from DAC 11 are input into a primary amplifier 46. When the voltages $V_1$ and $V_2$ are equal, the output of the first amplifier remains zero. When the output of amplifier 46 is zero, the output of a series-connected secondary amplifier 47 remains zero. Whenever the outputs of $V_1$ and $V_2$ differ, the output of the primary amplifier 46 varies in proportion to the difference between $V_1$ and $V_2$. If the output of primary amplifier 46 exceeds a level determined by the setting of variable potentiometers 48, 49, the output of the secondary amplifier 47 goes to full value positive state, generating an ON condition which activates latch circuit 18 by line 19. In operating state, the latch circuit is set so that its output is zero. When the secondary amplifier 47 is raised to the full value positive state, the latch circuit 18 changes to a positive state, and retains this state (latches itself in) until manually reset to zero state by an operator manipulating reset control 49. In the "latched-in" state, it generates the positive process interrupt signal conducted to computer 10 by line 22. It also activates an indicator such as the lamp 48 after passage through a driver 24. The lamp remains on until the manual reset by the operator. Similarly, low voltage comparator-amplifier 37 is engaged in a full positive state whenever the input voltage from line 36 exceeds the minimum value determined by the setting of the potentiometer 50, or in the case of the high voltage comparator-amplifier 42, the maximum value determined by the setting of potentiometer 51. Each comparator-amplifier 17, 37 and 42 is fitted with a capacitance shunt, suitably generating a 200 microsecond delay, to prevent the process interrupt signal from being produced erroneously due to unsettled conditions in the switching functions of the DACs rather than from a true defect in the signals. A suitable comparator-amplifier is commercially available from Texas Instruments, Inc. by the identification number TISN724L. A satisfactory latch circuit is provided by using one-half of a Fairchild DT$\mu$L 94659 quad.

Controller Selection Circuit

Referring back to FIG. 1, it is seen that bits 1a, 1b, and 1c of ECO word number 1 are separately signalled by the digital computer 10 under normal operating conditions, only one being signalled as binary 1, the other two being binary 0. (Or only one being signalled as binary 0, the other two being binary 1. Hereinafter only the first case is considered for simplicity). In order to determine the erroneous occurrence of two of the bits being signalled as binary 1, a plurality of ECO checking circuits are provided for each identifying binary word, equal in number to the number of digits in the word. Note that each of the ECO checking circuits is comprised of an OR gate responsive to all but one of the bits, and operative to generate a binary 1 signal if any one of its input bits is binary 1. The signal from the OR gate along with the bit to which the OR gate is nonresponsive are fed as inputs into an AND gate, which is responsive to generate an alarm signal (indicated as 1a') if both the bit to which the OR gate is nonresponsive and the OR gate output are binary 1. As more particularly shown in FIG. 2, the output from the AND gate in that event changes the state of a latch circuit 55 having the same construction as latch circuit 18, the output from the latch circuit (indicated as 1a'') being fed by line 60 to OR gate 20 which passes a process interrupt signal by line 22 back to digital computer 10 and also to an OR gate 61 which sends a signal switching the controllers to backup operation as described above in connection with the aberrant output control voltage detectors. Each of the ECO checking circuits for each bit operates identically, each of the circuits receiving a different one of the bits of one of the words as the input to its AND gate. Although not illustrated for simplicity of description, it will be understood that the bits of ECO word 2 each have an ECO checking circuit as described for the bits of ECO word 1. Suitable power supplies are separately provided to the DAC output control circuit and to the controller selection circuit.

The System As A Whole

As may be seen, the system as a whole functions to determine whether or not there is an error in either the DAC voltage output or in the binary signals from the digital computers selecting the controller which is to be operated by the control output voltage. Note that by the present invention, the digital computer will be removed from its control function by reason of suitable software, which can be provided by those skilled in the art, responsive to the process interrupt signal which is generated by the system of the present invention. Note also that the present system makes it obvious that a process interrupt has occurred by reason of the alarm lights which can be provided and which identify the source of the problem so that the problem can be corrected at an early time and the proper steps taken to return the digital computer to its process control function.

Having disclosed the invention, what is to be covered by Letters Patent is set forth in the appended claims.

We claim:

1. A system for the detection of erroneous control information produced in a digital computer operating a direct digital control system, which comprises:

A direct digital control computer for generating digital control signals responsive to selected conditions in a controlled process and for generating at least two multiple-bit ECO words capable of identifying a controlled device, each of said words containing at least three bits, a first digital-to-analog converter operative to convert a digital control signal into a corresponding first output control voltage for controlling one of a plurality of controllers, a second digital-to-analog converter operative to convert said digital control signal into a corresponding second output control voltage which is normally the same as the first output control voltage, a differential voltage comparator-amplifier responsive to said first output control voltage and said second output control voltage and operative to generate a first error signal when the voltage differential between the first output control voltage and the second output control voltage exceeds a preset maximum, and containing a time delay circuit for said first output control voltage, a first latch circuit responsive to the first error signal from said differential voltage comparator-amplifier to generate a first process interrupt voltage and a first backup control activate signal, amplifying means responsive to the first backup control activate signal and operative to engage backup control means operatively associated with said controllers to operate said controllers, for each identifying word, a plurality of ECO checking circuits equal in number to the number of bits in said word, each of ECO checking circuits comprising:

an OR gate responsive to all but one of the bits of said word and operative to generate an ON state signal, which may be binary 1 or binary 0, if any of the input bits is the same ON state binary digit, an AND gate responsive to the one bit of said word to which the OR gate is nonresponsive and to the output from said OR gate to generate an alarm signal if both the one bit and the OR gate output are the same ON state binary digit, an ECO alarm latching circuit responsive to an alarm signal from said AND gate and operative to generate a second process interrupt voltage and a second backup control activate signal, amplifying means responsive to said second backup control activate signal and operative to engage backup control means operatively associated with said controllers to operate said controllers, each of said ECO checking circuits receiving a different one of said bits of said word as an input to an AND gate, a plurality of control circuits each having a plurality of switches with one switch for each of said words, each switch being responsive to only one bit of only one of said words, such that said first output control voltage will be transmitted to a particular controller only if said one bit of each of said words is received from said digital computer, and a plurality of controllers each responsive to only one of said control circuits.

2. The system of claim 1 further comprising:

a low voltage comparator-amplifier responsive to said first output control voltage and a preset minimum voltage standard and operative to generate a second error signal when said first output control voltage falls below said preset minimum voltage standard, and containing a time delay circuit for said first output control voltage, a second latch circuit responsive to said second error signal from said low voltage comparator-amplifier to generate a second process interrupt signal and a second backup control activate signal, said amplifying means further being responsive to said second backup control activate signal.

3. The system of claim 1 further comprising:
a high voltage comparator-amplifier responsive to said first output control voltage and a preset maximum voltage standard and operative to generate a third error signal when said first output control voltage exceeds said maximum voltage standard, and containing a time delay circuit for said first output control voltage,
a third latch circuit responsive to said third error signal from said high voltage comparator-amplifier to generate a third process interrupt signal and a third backup control activate signal, said amplifying means further being responsive to said third backup control activate signal.

4. A system in accordance with claim 1 in which the time delay circuit in said differential voltage comparator-amplifier is 200 microseconds.

5. An error detection system for detecting erroneous control information from a direct digital control computer linked to a plurality of process controllers in a process control system, wherein:
said computer generates digital control signals in response to selected conditions in a controlled process, and a first digital-to-analog converter converts such a control signal into a first output control voltage,
said computer also generating at least two multiple bit ECO words of at least three bits each for identifying the particular controller to receive said first output voltage, and wherein
said process controllers each have a control circuit containing a plurality of switches with one switch for each of said words, each switch being responsive to only one bit of only one of said words such that said first output control voltage will be transmitted to a particular controller only if said one bit of each of said words is received from said digital computer, and wherein
each of said controllers is operatively associated with backup control means for operating such controller on interruption of direct control from said computer,
said system comprising:
a second digital-to-analog converter operative to convert said digital control signal into a corresponding second output control voltage which is normally the same as the first output control voltage,
a differential voltage comparator-amplifier responsive to said first output control voltage and said second output control voltage and operative to generate a first error signal when the voltage differential between the first output control voltage and the second output control voltage exceed a preset maximum, and containing a time delay circuit for said first output control voltage,
a first latch circuit responsive to the first error signal from said differential voltage comparator-amplifier to generate a first process interrupt signal and a first backup control activate signal,
amplifying means responsive to the first backup control activate signal and operative to engage said backup control means; and
for each identifying word, a plurality of ECO checking circuits equal in number to the number of bits in said word,
each of said ECO checking circuits comprising:
an OR gate responsive to all but one of the bits of said word and operative to generate an ON state signal, which may be binary 1 or binary 0, if any of the input bits is the same ON state binary digit,
an AND gate responsive to the one bit of said word to which the OR gate is nonresponsive and to the output from said OR gate to generate an alarm signal if both the one bit and the OR gate output are the same ON state binary digit,
an ECO alarm latching circuit responsive to an alarm signal from said AND gate and operative to generate a second process interrupt signal and a second backup control activate signal,
amplifying means responsive to said second backup control activate signal and operative to engage said backup control means,
each of said ECO checking circuits receiving a different one of said bits of said word as an input to an AND gate.

6. The system of claim 5 further comprising:
a low voltage comparator-amplifier responsive to said first output control voltage and a preset minimum voltage standard and operative to generate a second error signal when said first output control voltage falls below said preset minimum voltage standard, and containing a time delay circuit for said first output control voltage,
a second latch circuit responsive to said second error signal from said low voltage comparator-amplifier to generate a second backup control activate signal, said amplifying means further being responsive to said second backup control activate signal.

7. The system of claim 5 further comprising:
a high voltage comparator-amplifier responsive to said first output control voltage and a preset maximum voltage standard and operative to generate a third error signal when said first output control voltage exceeds said maximum voltage standard, and containing a time delay circuit for said first output control voltage,
a third latch circuit responsive to said third error signal from said high voltage comparator-amplifier to generate a third process interrupt signal and a third backup control activate signal, said amplifying means further being responsive to said third backup control activate signal.

8. A system in accordance with claim 5 in which the time delay circuit in said differential voltage comparator-amplifier is 200 microseconds.

9. A system for the detection of erroneous control information produced in a digital computer operating a direct digital control system, which comprises:
a direct digital control computer for generating digital control signals responsive to selected conditions in a controlled process and for generating at least two multiple-bit ECO words capable of identifying a controlled device, each of said words containing at least three bits,
a first digital-to-analog converter operative to convert a digital control signal into a corresponding first output control voltage for controlling one of a plurality of controllers,
a second digital-to-analog converter operative to convert said digital control signal into a corresponding second output control voltage which is normally the same as the first output control voltage, a differential voltage comparator-amplifier responsive to said first output control voltage and said second output control voltage and operative to generate a first error signal when the voltage differential between the first output control voltage and the second output control voltage exceeds a preset maximum, and containing a time delay circuit for said first output control voltage, a first latch circuit responsive to the first error signal from said differential voltage comparator-amplifier to generate a first process interrupt voltage and a first backup control activate signal, amplifying means responsive to the first backup control activate signal and operative to engage backup control means operatively associated with said controllers to operate said controllers, for each identifying word, a plurality of ECO checking circuits equal in number to the number of bits in said word, each of ECO checking circuits comprising:

an OR gate responsive to all but one of the bits of said word and operative to generate an ON state signal, which may be binary 1 or binary 0, if any of the input bits is the same ON state binary digit, an AND gate responsive to the one bit of said word to which the OR gate is nonresponsive and to the output from said OR gate to generate an alarm signal if both the one bit and the OR gate output are the same ON state binary digit, an ECO alarm latching circuit responsive to an alarm signal from said AND gate and operative to generate a second process interrupt voltage and a second backup control activate signal, amplifying means responsive to said second backup control activate signal and operative to engage backup control means operatively associated with said controllers to operate said controllers, each of said ECO checking circuits receiving a different one of said bits of said word as an input to an AND gate, a plurality of control circuits each having a plurality of switches with one switch for each of said words, each switch being addressed by only one bit of only one of said words, said switches closing in response to receipt of a signal that the addressing bits for such switches are transmitted from said digital computer, whereby said first output control voltage will be transmitted to a particular controller only if each of said switches is addressed, and a plurality of controllers each responsive to only one of said control circuits.

* * * * *